Figure 1:
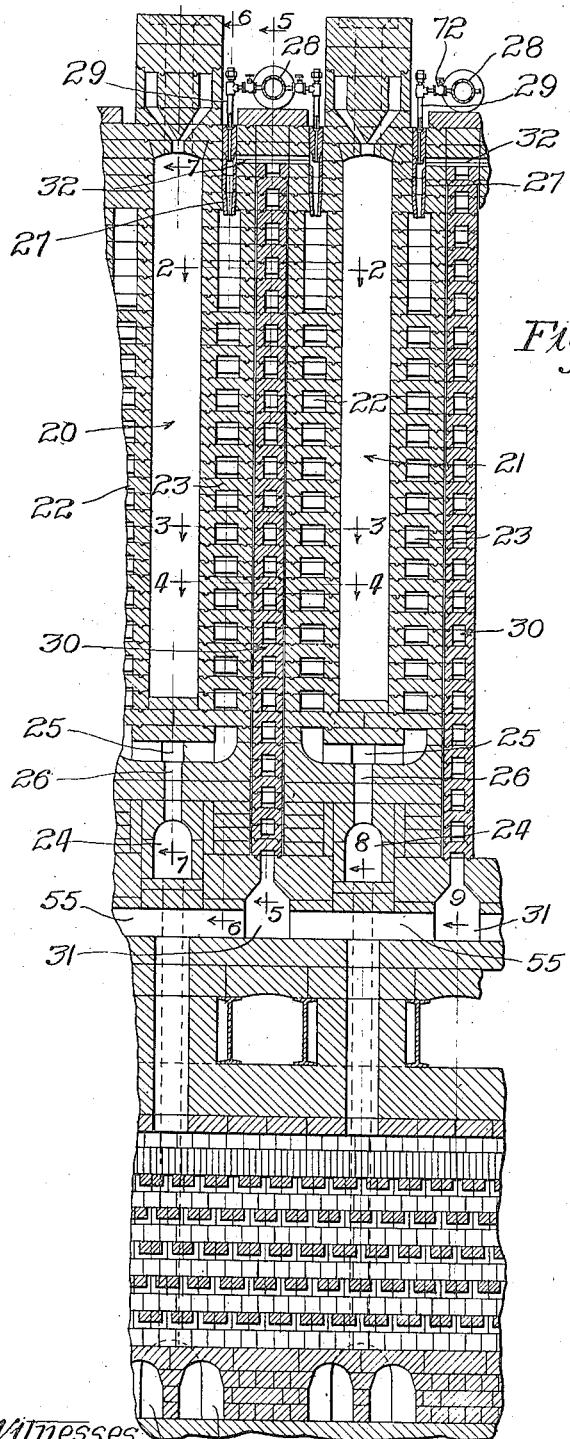

A. ROBERTS.
RECUPERATIVE COKE OVEN.
APPLICATION FILED DEC. 4, 1914. RENEWED MAY 8, 1916.

1,193,066.

Patented Aug. 1, 1916.
7 SHEETS—SHEET 1.

Witnesses
Inventor
Arthur Roberts

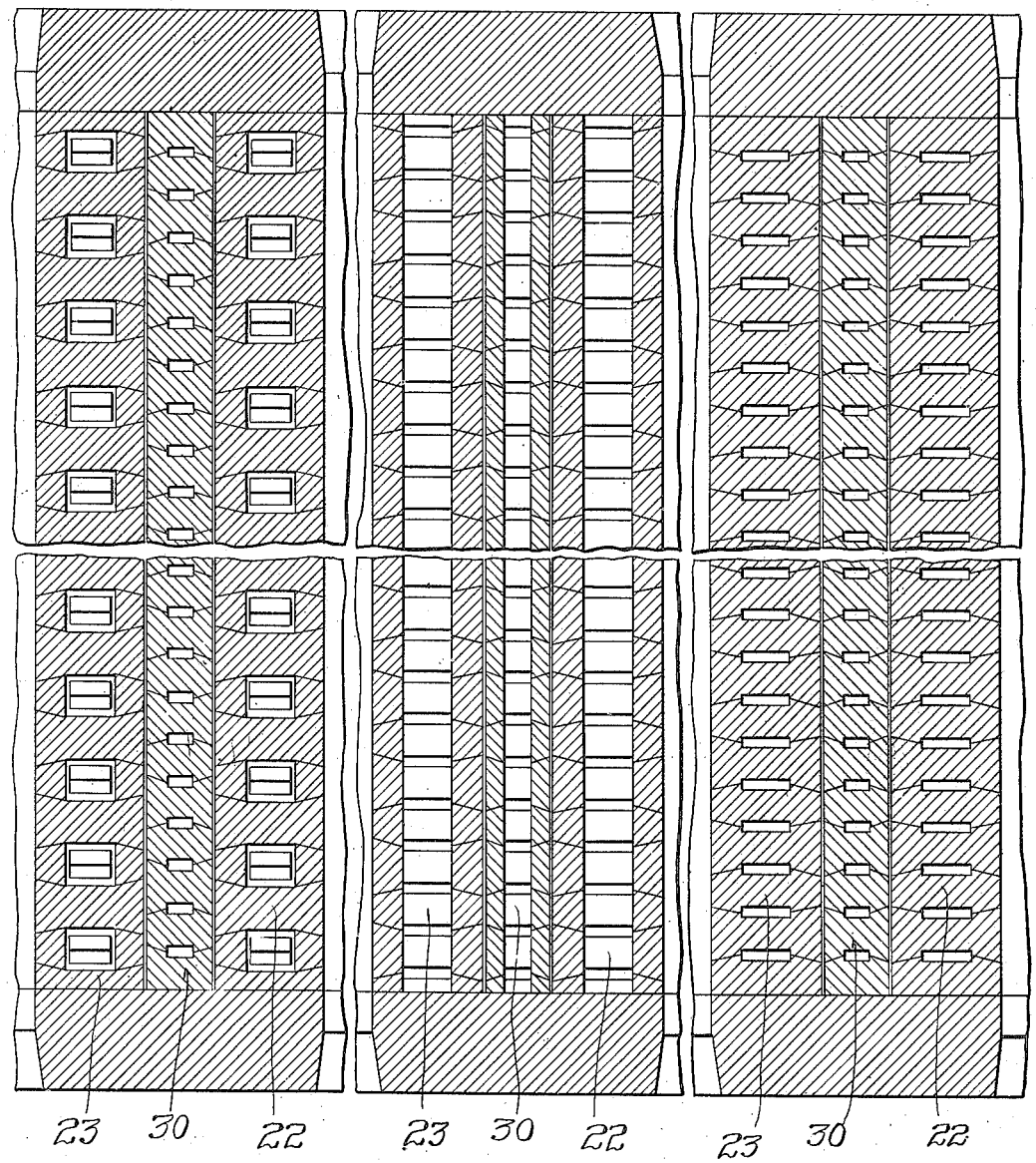

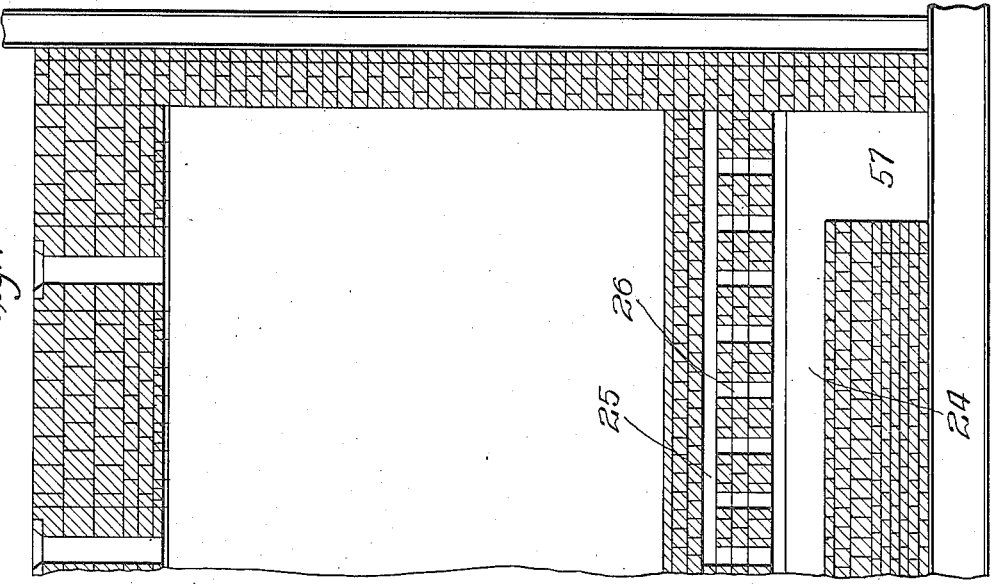
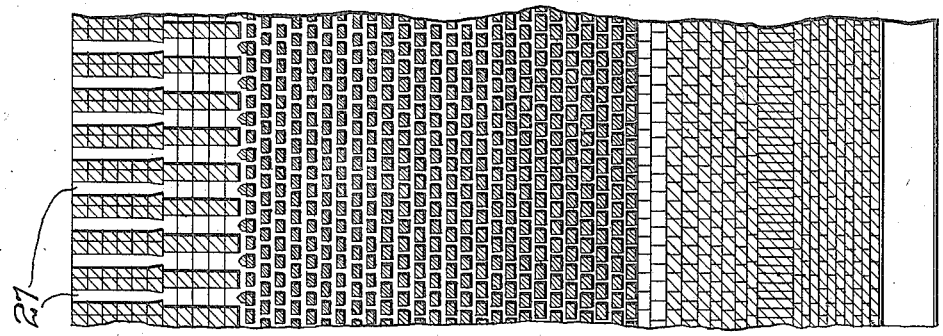
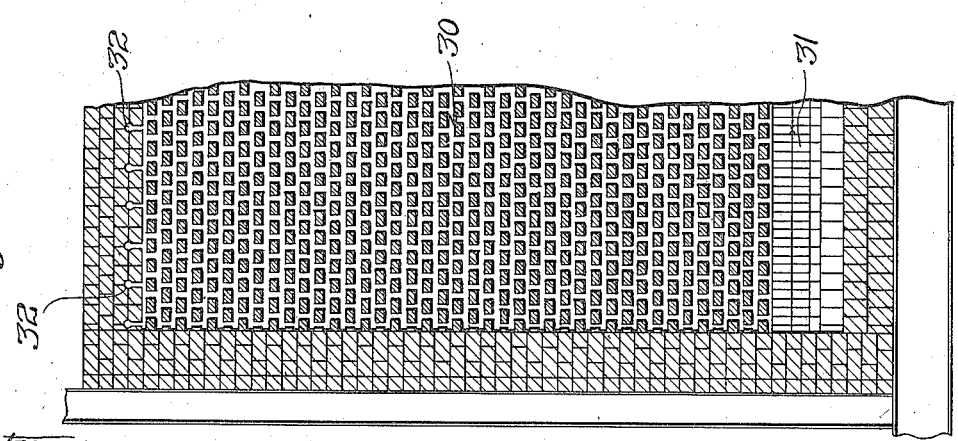

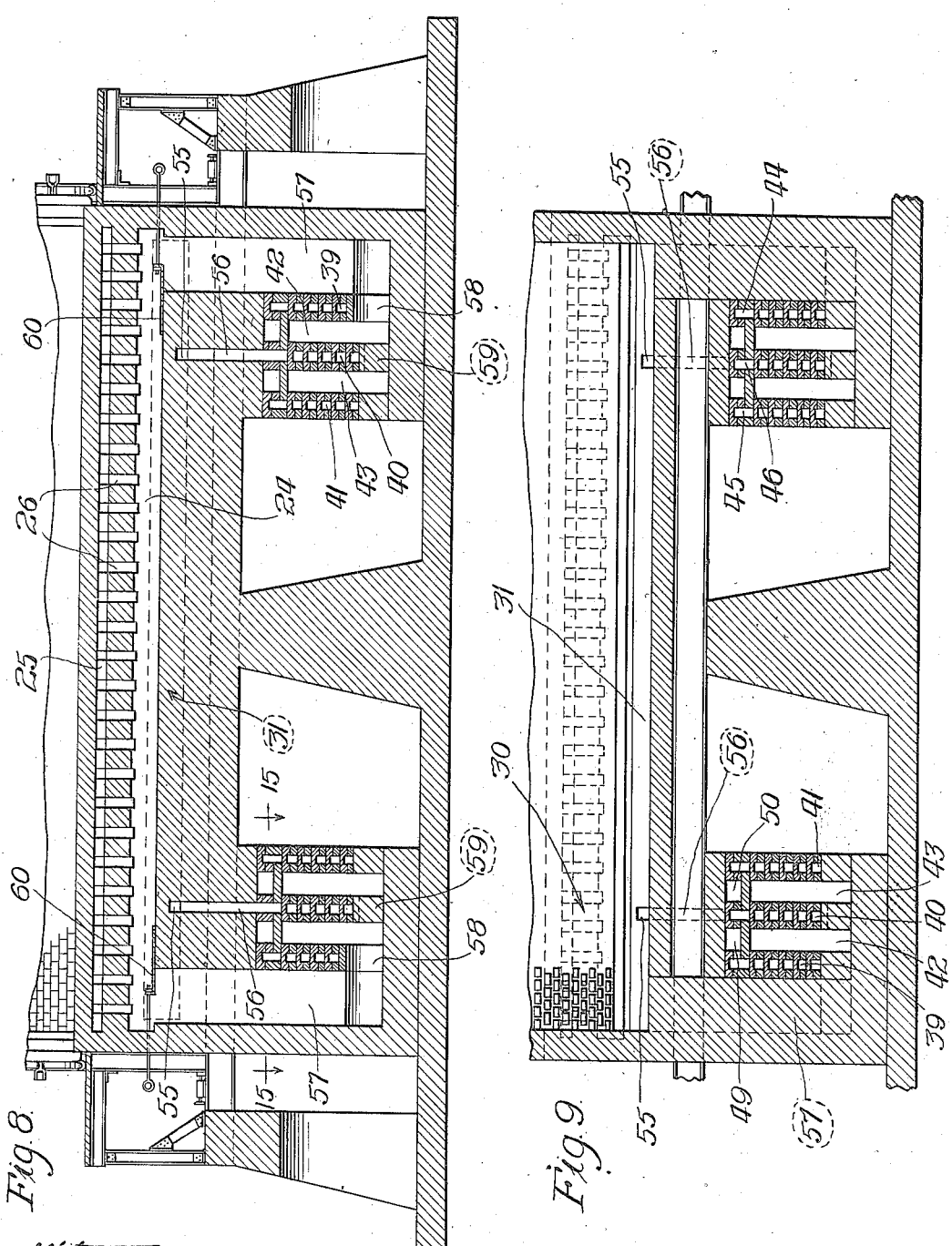

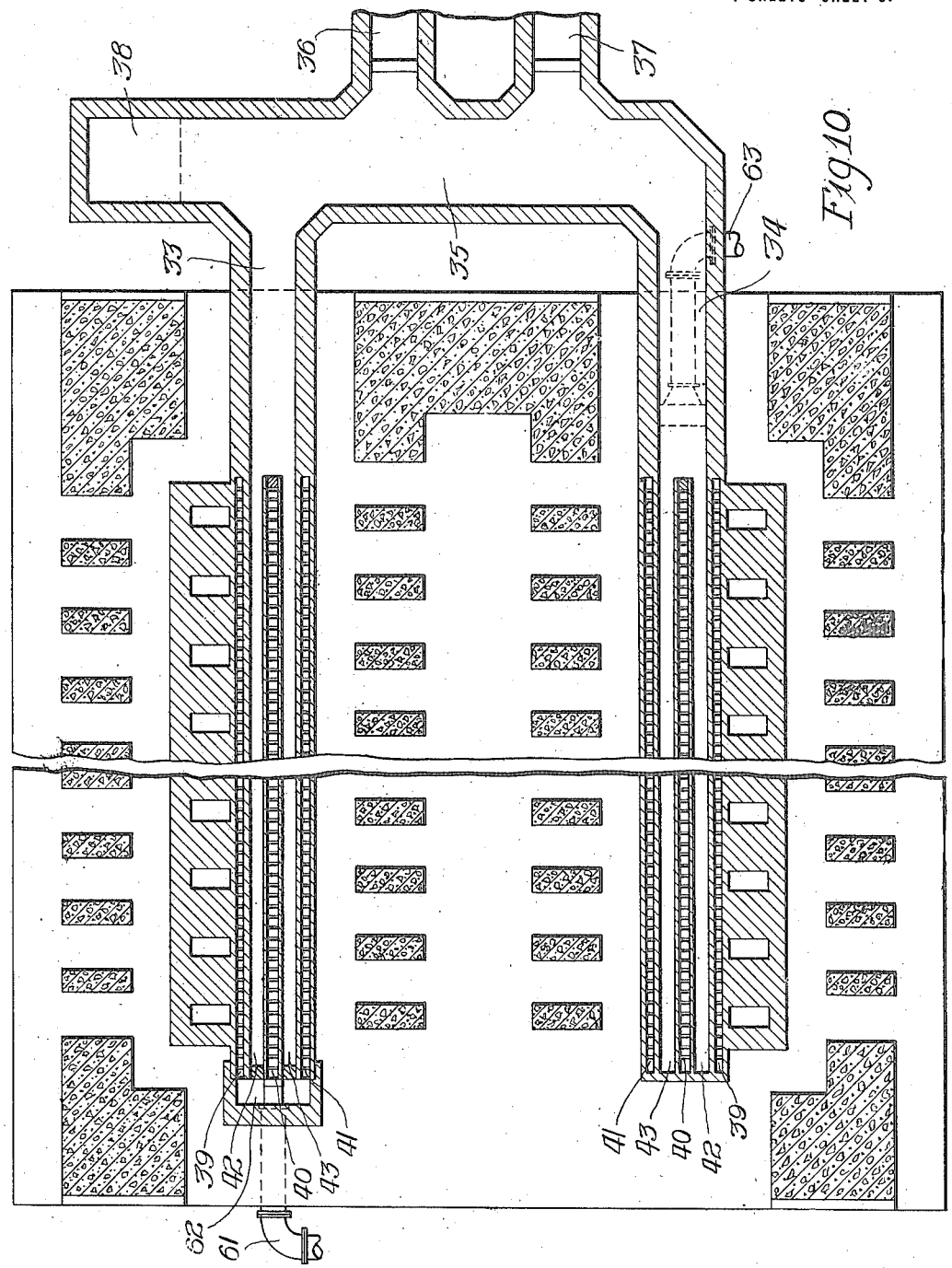

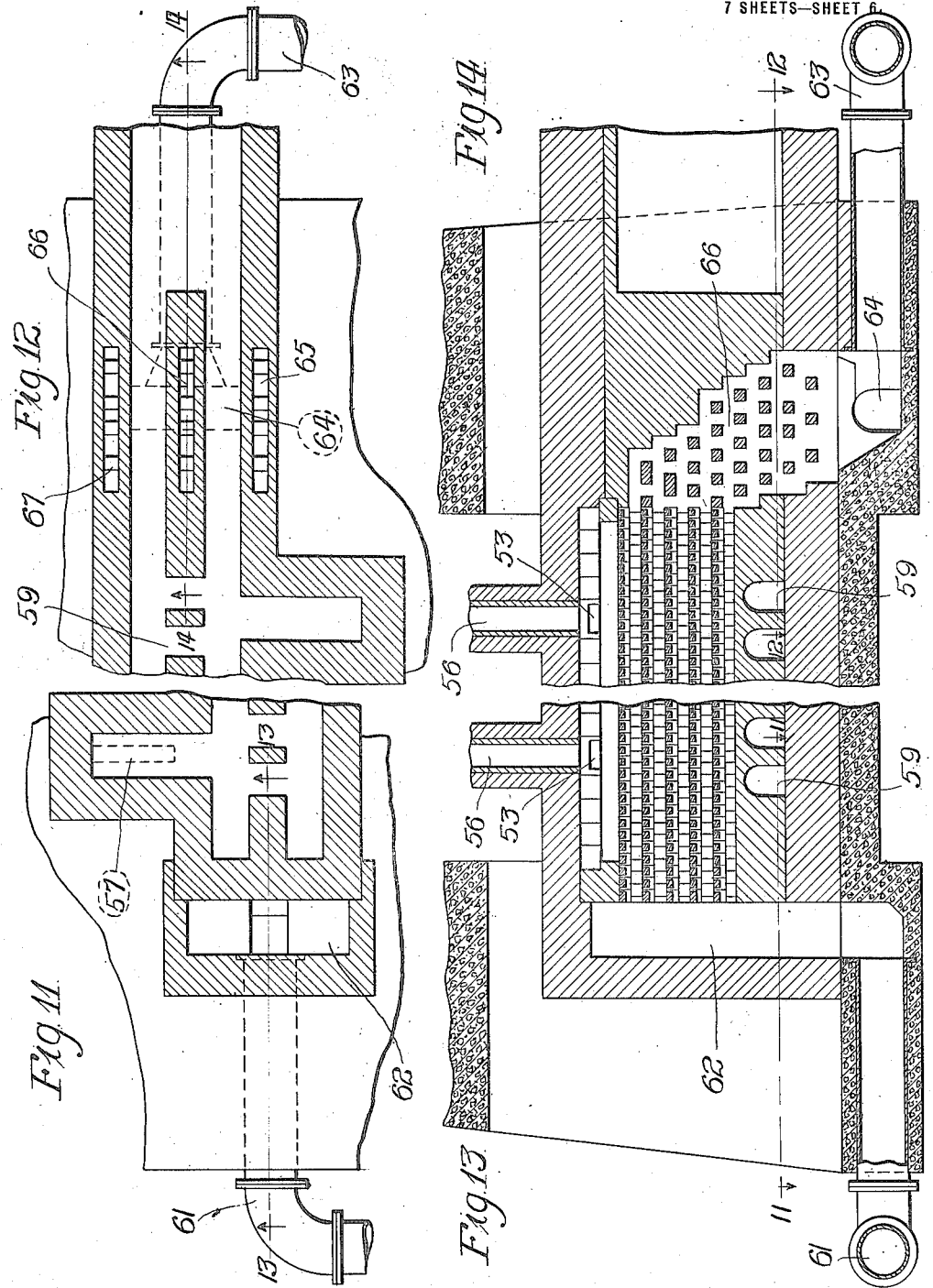

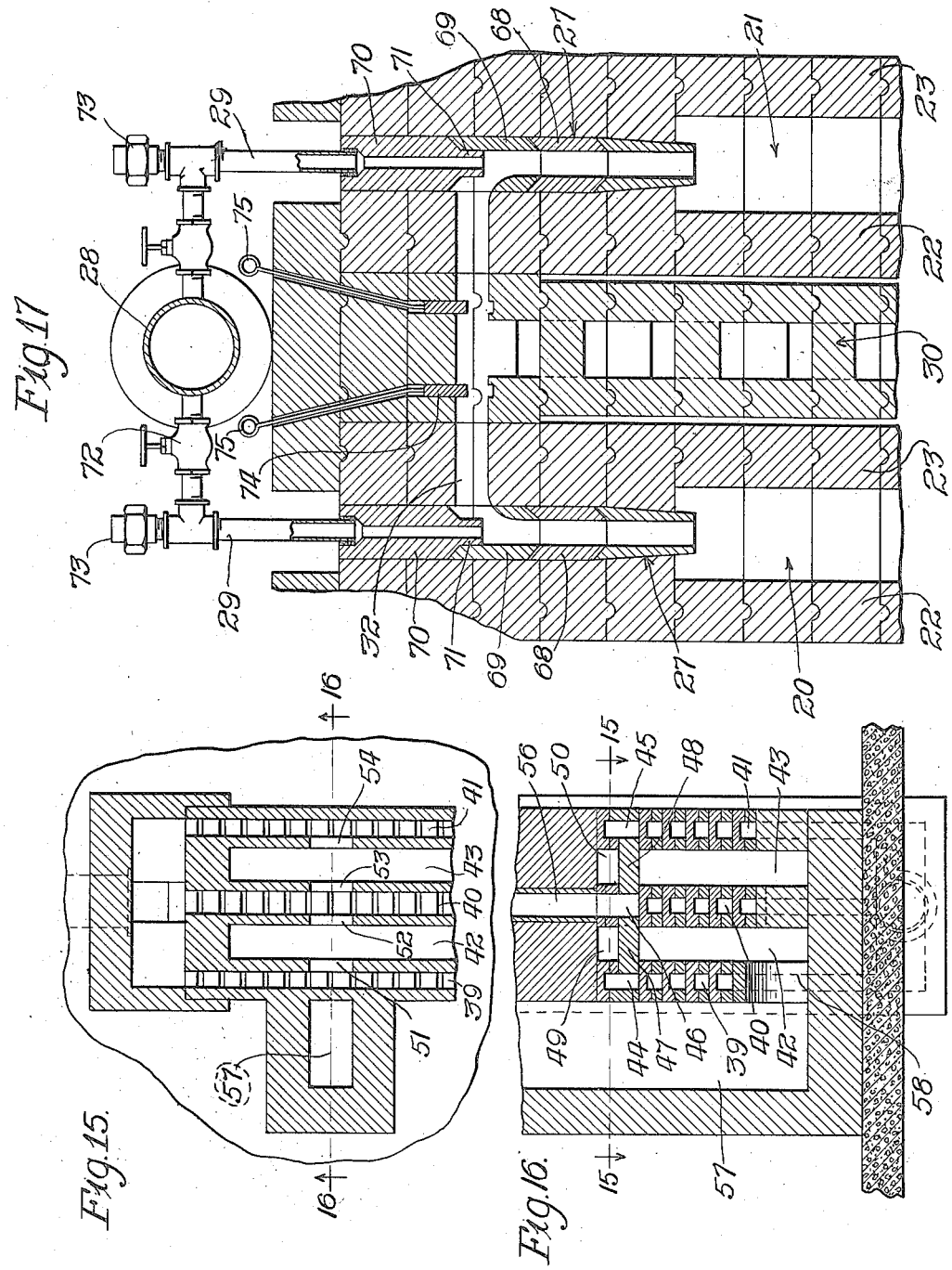

UNITED STATES PATENT OFFICE.

ARTHUR ROBERTS, OF EVANSTON, ILLINOIS.

RECUPERATIVE COKE-OVEN.

1,193,066.   Specification of Letters Patent.   Patented Aug. 1, 1916.

Application filed December 4, 1914, Serial No. 875,503. Renewed May 8, 1916. Serial No. 96,250.

*To all whom it may concern:*

Be it known that I, ARTHUR ROBERTS, a citizen of the United States, residing at Evanston, county of Cook, and State of Illinois, have invented certain new and useful Improvements in Recuperative Coke-Ovens, of which the following is a specification.

The present invention has reference to certain improvements in coke ovens of that type in which a portion, if not all, of the waste heat contained in the spent heating gases is recuperated for the heating of the incoming air which is to be used in the combustion passages or chambers. In this type of construction the outgoing spent gases, which contain the heat which it is desired to recover, are caused or allowed to travel constantly in certain chambers, whereas the incoming air always travels in certain other passages, and the heat from the spent gases is transmitted to the air by conduction through the separating partitions or walls.

It is desired particularly to provide a construction embodying the recuperative principle and wherein the air for combustion is to be brought into mixture with the flue gas at a point adjacent to the top of the oven structure. It is also intended particularly to provide a construction such that the incoming air which is undergoing recuperation may travel upward between the adjacent oven structures and adjacent to practically the entire wall surface of each oven structure at all times, so as to secure a maximum amount of heat abstraction.

One of the features of the invention has reference to the use of peculiarly formed or constructed walls for the provision of the air passages, which walls, when constructed from suitably formed blocks, shall be of an extremely rigid or solid construction, and will at the same time provide the necessary air passages by simply laying the blocks together in the proper manner.

Another object in this connection is to so construct the walls that the heat will be transmitted into their interior or central portions with a maximum of efficiency, so as to supply the necessary heat to the air under the best possible conditions.

Another object of the invention is to so form or relate the parts that the recuperating principle can be associated with or embodied into that type of coke oven which is shown and described in my co-pending application for a patent on improvement in coke ovens, Serial No. 860583, filed September 8, 1914.

Other objects and uses will appear from a detailed description of the invention, which consists in the features of construction and combinations of parts hereinafter described and claimed.

Referring to the drawings—Figure 1 shows a cross-section through a portion of a bench of coke ovens, which ovens embody the principles of construction disclosed in the aforementioned application, Serial No. 860583, and to which have been applied the recuperative constructions which are herein disclosed; Fig. 2 is a horizontal section taken on the line 2—2 of Fig. 1, looking in the direction of the arrows, showing the adjacent walls of two consecutive ovens and the intermediate recuperating wall; Fig. 3 is a section similar to that of Fig. 2 but taken on the line 3—3 of Fig. 1, looking in the direction of the arrows; Fig. 4 is another section similar to that of Fig. 2 but taken on the line 4—4 of Fig. 1, looking in the direction of the arrows; Fig. 5 is a vertical longitudinal section taken on the line 5—5 of Fig. 1, looking in the direction of the arrows, being a vertical section through the recuperative wall construction; Fig. 6 is a vertical section taken on the line 6—6 of Fig. 1, looking in the direction of the arrows, being a section through the heating wall construction; Fig. 7 is a section taken on the line 7—7 of Fig. 1, looking in the direction of the arrows, being a section through the carbonizing chamber; Fig. 8 is a section taken on the line 8—8, looking in the direction of the arrows, corresponding to a continuation of the section 7—7 downward through the foundation, for the purpose of showing particularly the manner in which the spent gases reach the discharge tunnels beneath the oven structure; Fig. 9 is a section taken on the line 9—9 of Fig. 1, looking in the direction of the arrows, corresponding to a continuation of the section 5—5 downwardly through the foundation of the structure, and shows particularly the manner in which the incoming air is passed upwardly after recuperation in the discharge channels to oven channels, from which it reaches the recuperative wall; Fig. 10 is a plan view of the foundation of the structure, showing particularly the general arrangement of the channels therein; Fig. 11 is an enlarged detail of the structure contained in the upper left-hand corner of Fig. 10; Fig. 12 is an enlarged detail of the structure contained in the lower right-hand corner of Fig. 10; Fig. 13 is a vertical section taken on the line 13—13 of Fig. 11, looking in the direction of the arrows; Fig. 14 is a vertical section taken on the line 14—14 of Fig. 12, looking in the direction of the arrows; Fig. 15 is a horizontal section taken on the line 15—15 of Fig. 8, looking in the direction of the arrows; Fig. 16 is a vertical section taken on the line 16—16 of Fig. 15, looking in the direction of the arrows, and Fig. 17 is an enlarged detail section through the upper portion of the structure shown in Fig. 1.

In Figs. 1 and 17 two adjacent carbonizing chambers are designated by numerals 20 and 21. Each is formed by the side walls 22 and 23. These side walls may be of any suitable construction which provides the necessary gas passages for the heating gases, but in the arrangement illustrated I have shown that construction of wall which is built up from blocks having notches or recesses formed in their side and bottom faces, so that when the blocks are set together in courses, or in any other desired manner, there will be provided a network of interconnecting, zig-zag or stepped passages, through which the heating gases may travel. This type of wall is peculiar in that the same blocks extend clear through from one outside face of the wall to the other, or, in other words, from the inner surface of the carbonizing chamber to the outside surface of the wall. The wall, therefore, possesses great mechanical strength, combined with the provision of the necessary gas passages in an air-tight manner, with an exceedingly simple form of construction.

The coke oven structure herein disclosed is similar to that disclosed in the aforesaid co-pending application, also, in the feature that there is provided beneath each carbonizing chamber a sole channel designated 24, which runs across the width of the bench, said channel being connected to the sole passage 25 immediately beneath the sole of the oven by a plurality of downwardly extending openings 26. Each of the sole passages 25 in turn connects to the lower or discharge ends of the gas passages of the adjacent heating walls for the corresponding oven. It therefore appears that the spent heating gases for each oven collect in one of the oven channels 24.

At the upper end of each of the oven heating walls there is provided a plurality of nozzles or burners 27, which direct the heating gases downwardly in the corresponding heating wall. These nozzles or burners must be provided with gas and air, and in the peculiar arrangement illustrated the gas is conveyed to the nozzles by headers 28 mounted between the upper portions of consecutive ovens. Each header in turn supplies its gas by a series of connections 29 to the adjacent nozzles or burners, and this construction will be explained in detail presently. The air for supporting the combustion is to be delivered adjacent to the nozzles or burners 27 after being heated by recuperation to the desired extent. For this purpose I provide passages extending upwardly between consecutive coke ovens and between the adjacent heating walls, so that the air flowing through said passages may be heated by recuperation from such walls.

In the present application I have illustrated a construction in which there is built between each pair of coke ovens a separate or independent wall, which wall is separated from the coke oven heating walls a slight distance when the ovens are cold. When the ovens have been heated up to working temperature they expand to such an extent as to completely take up this space or clearance, so that the adjacent oven walls with the intermediate walls come together to form a solid wall construction extending through from the inner surface of one carbonizing chamber to the inner surface of the next adjacent carbonizing chamber.

In the present case I have illustrated a construction in which this intermediate wall is so formed that recuperation of the air can take place within it. These walls are designated at 30 in Fig. 1. It will be noticed from said figure, and also from Fig. 17, that there is a slight clearance between each wall 30 and the adjacent oven walls, but, as previously explained, this clearance will be taken up when the ovens are heated to working temperature.

Each of the recuperating walls 30 is to be provided with the desired passages for the accommodation of the up-flowing air. As a simple and extremely desirable means for providing said passages, I build up the recuperating walls in a manner similar to that of the oven walls—that is, by the use of notched or recessed blocks, which, when laid together, provide a network of inter-connected air passages. This construction is well illustrated in Figs. 2, 3, 4 and 5. It will be seen from these figures that the recuperating blocks are of two forms, every alternate block having its end portions tapered toward each other, while the intermediate blocks have their end portions flared outwardly, so that where these two kinds of blocks are set together alternately they "keystone" together to provide a very solid construction.

Underneath each recuperating wall I provide an oven channel 31, which supplies air to the lower portion of the corresponding recuperating wall throughout its entire length. This fact is well illustrated in Figs. 1, 5 and 9.

In the upper portion of each wall structure there is provided a plurality of transverse openings 32 having their inner ends in communication with the upper portion of the network of passages in the recuperating wall and having their outer ends communicating with the adjacent burners, to which they supply air for combustion. This construction is well illustrated in Figs. 1, 5 and 17.

There must be provided connections and passages for leading the spent gases away from the oven channels 24, and there must also be provided connections for supplying air either directly or indirectly to the channels 31.

As the spent gases leave the channels 24 their temperature will ordinarily be of such an intensity that a considerable portion of their heat may be advantageously removed for recuperation or the like. I have therefore provided an additional recuperating structure in which additional heat will be abstracted from these gases, and as a convenient form of arrangement this additional structure is placed in the substructure of the bench and beneath the ovens themselves.

Referring to Fig. 10, I have therein shown in outline the foundation plan for a bench of ovens, the central portion of the bench being broken away so as to shorten up the figure. Underneath the end portions of each oven I provide the channels 33 and 34, which run lengthwise of the bench and transversely of the individual ovens. These channels convey the spent gases to a header 35, from which they may be delivered either through the connections 36 and 37 to waste heat boilers or to an extension 38, on which may be constructed a stack. It will be observed from an examination particularly of Fig. 10 that that portion of each of these channels 33 and 34 lying directly beneath the end portions of the ovens is built up from three walls, 39, 40 and 41, which provide between them the spaces 42 and 43. Each of the walls 39, 40 and 41 is a recuperating wall and the spent gases travel in the spaces 42 and 43 until they approach near to the header 35, whereupon these spaces are merged together and the entire body of spent gases is delivered into the header.

Reference particularly to Figs. 8, 9 and 11–16, inclusive, will show the construction of the walls 39, 40 and 41, which provide the spaces 42 and 43, and will show the manner in which these various walls and spaces are connected up. Each of the walls 39, 40 and 41 is built up from blocks similar in form to the blocks of the oven and recuperating walls, viz: blocks having their side and bottom portions recessed so that when they are set together there is provided on the interior of the wall an inter-connecting network of passages. The upper portions of the two outside walls have the openings or passages 44 and 45, while the upper portion of the middle wall 40 has the opening 46. The air which works through the network of the middle wall may collect directly in the passage 46 after traveling such network, and in like manner the air flowing through the networks of the outside walls collects directly in the passages 44 and 45. The pavements 47 and 48 serve to provide other passages 49 and 50 above, but separated from, the passages 42 and 43, respectively. Reference particularly to Figs. 13, 15 and 16 will disclose the openings 51, 52, 53 and 54 in the upper portions of the walls 39, 40 and 41. These openings are well shown particularly in Fig. 13. Through them the air from the passages 44 and 45 reaches the passages 49 and 50, and in turn flows from the passages 49 and 50 into the passage 46. It thus appears that ultimately all of the air will be enabled to collect in the passage 46.

Referring particularly to Figs. 1, 8 and 9, there will be observed the passages 55 running lengthwise of the bench underneath the end portions of the tunnels 24 and separated from them, the passages 55 connecting together the end portions of the air channels 31.

Referring to Fig. 8 in particular, there are shown the risers 56 which connect these passages 55 at spaced intervals with the passages 46 on the two sides of the bench. It is therefore apparent that the air, after being recuperated in the walls 39, 40 and 41, is free to pass upward and find its way into the recuperating walls 30, where a still further recuperation will take place. The spent gases from the channels 24 must find the way down and into the passages 42 and 43. For this purpose the ends of the channels 24 connect by means of the down-comers 57 through the openings 58 with the outer passages 42. Other openings 59 connect together at spaced intervals the passages 42 and 43 so that the spent gases are free to distribute themselves in both of said passages. Dampers 60 may be provided for controlling the flow of the spent gases at each end of each oven.

Figs. 11, 12, 13 and 14 show plan and sectional details of the two diagonally opposite corners of the plan arrangement shown in Fig. 10. At the upper left-hand corner, which is illustrated in Figs. 11 and 13, is an air supply pipe 61 which leads into a riser 62. This riser extends across the entire width of the flue and has its upper end in communication with the passages 49 and 50. At the other end of the channel 33 these passages 49 and 50 are closed, the air being at spaced intervals withdrawn from them to supply the various ovens. In that corner of the structure which appears in the lower right-hand side of Fig. 10 there is an air supply pipe 63, which extends underneath the channel 34 to a point slightly in advance of the last coke oven of the series. At such point this pipe 63 communicates with a transverse passage 64, which in turn connects, by means of the risers 65, 66 and 67, with the recuperating walls 39, 40 and 41, respectively. The other ends of these recuperating walls and of the corresponding passages 49 and 50 are closed in a manner similar to that previously described with respect to the recuperating walls and passages adjacent to the channel 33. It thus appears that the incoming air travels in opposite directions on the two sides of the bench. Inasmuch as each coke oven draws its air supply from each end, it follows that the air resistance for the supply of air to each oven will be the same as that for all of the other ovens, so that assurance will be had that all the ovens will operate under the same or equal conditions.

Referring particularly to Fig. 17, each of the burners 27 is shown as built up from a series of circular sections 68, which have their upper and lower end surfaces tapered or counter-bored so that they seat together. The lowermost section is preferably tapered so that it seats nicely in a tapered socket, the other sections resting upon it. The upper section 69 is provided with a side opening which communicates with the corresponding opening 32 for the supply of air. Immediately above the section 69 is another section 70, having a nozzle tip 71 through which the gas is delivered under pressure to a point preferably somewhat below the center of the air inlet 32. By this arrangement the incoming gas, which may be under considerable pressure, will draw in air from the side opening so that a mixing action will continue until the air and gas are discharged from the lower end of the burner. A valve 72 is preferably provided for controlling the supply of gas to each burner individually, and a sight opening 73 is preferably provided so that the operator can look down through each nozzle and observe the conditions existing in the heating wall beneath the same. Each sight opening is preferably closed with a blue glass window.

In order to permit of an individual control of the air supplies, I have illustrated the dampers 74 working in the passages 32, each damper having a handle 75 whereby it may be manipulated. However, I desire to call attention to the fact that ordinarily the supply of air to the various nozzles will adjust itself automatically, or nearly so. This will follow for the reason that the air delivered by the pipes 61 and 63 may be under just sufficient pressure to overcome the frictional resistance to flow, so that the drawing effect at each nozzle or burner will govern or control the volume of air drawn at that point.

From the foregoing description it will appear that the recuperation may take place in either or both of two locations, viz: in the spent gas tunnel beneath the ovens or between the consecutive oven walls. By combining both forms of recuperation a maximum heating effect can be secured. It will also be observed that by the provision of the various dampers, including the dampers 60 and 74, and by reason of the peculiar drawing effect in the burners, the supply of air to each oven and the delivery of the spent gases therefrom can be accurately controlled, so that each oven can be made to perform a specified character and quality of work.

While I have herein shown and described only a single form of construction embodying the features of my invention, it will, of course, be understood that I do not limit myself to the same except as I may do so in the claims.

I claim:

1. A bench of coking retorts each provided on each side with heating means, and means to supply the same with gas and air in suitable quantities for combustion, in combination with recuperators between the adjacent walls of adjacent retorts, such recuperators being constructed as independent elements, capable of being removed without disturbance of the retorts and the heating means thereof.

2. A bench of coking retorts having heating means in their side walls, and means for supplying the heating means with gas and air in suitable quantities for combustion, in combination with recuperators between the adjacent walls of adjacent retorts, such recuperators being constructed as independent elements, capable of being removed without disturbance of the retorts and the heating means thereof.

3. A bench of coking retorts having heating means in their side walls, and means for supplying the heating means with gas and air in suitable quantities for combustion, in combination with recuperators between the adjacent walls of adjacent retorts, such recuperators being constructed as independent self-contained elements, capable of expansion and adjustment independent of the retorts and the heating means thereof.

4. A bench of coking retorts having heating means in their side walls, and means for supplying the heating means with gas and air in suitable quantities for combustion, in combination with recuperators between the adjacent walls of adjacent retorts, such recuperators being constructed as independent elements having their side walls air-tight, and capable of being removed without disturbance of the retorts and the heating means thereof.

5. A bench of coking retorts having heating means in their side walls, and means for supplying the heating means with gas and air in suitable quantities for combustion, in combination with recuperators between the adjacent walls of adjacent retorts, such recuperators being constructed as independent elements having air passages on their interior portions and having their side walls airtight, and capable of being removed without disturbance of the retorts and the heating means thereof, and connections for the delivery of air from said air passages to said heating means.

6. The combination with a suitable foundation, of a plurality of coking retorts independently mounted thereon, each of said retorts having heating means in its side walls and having means for supplying said heating means with gas and air in suitable quantities for combustion, and recuperators independently mounted on the foundation between the adjacent walls of adjacent retorts, and capable of being removed without disturbance of the retorts and the heating means thereof.

7. The combination with a suitable foundation, of a plurality of coking retorts independently mounted thereon, each of said retorts having heating means in its side walls and having means for supplying said heating means with gas and air in suitable quantities for combustion, and recuperators independently mounted on the foundation between the adjacent walls of adjacent retorts, each recuperator having air passages on its interior portion and having its side walls of air-tight construction.

8. A self-contained recuperator for use in a bench of coke ovens, said recuperator being relatively narrow from side to side as compared to its vertical and its other horizontal dimension, there being a plurality of air passages on the interior of the recuperator, and there being a channel extending along the lower portion of the recuperator and in communication with the aforementioned air passages, and a plurality of side connections for the delivery of air from the upper portions of the air passages, the side walls of the recuperator being air tight, whereby the recuperator is self-contained from its lower to its upper portion, and whereby air entering the passages from the channel is caused to travel through the passages to the delivery connections.

9. A self-contained recuperator for use in a bench of coke ovens, said recuperator being provided on its interior portion with air passages for the transfer of air in a vertical direction, there being an air channel adjacent to one edge of the recuperator and in communication with the aforementioned air passages, and there being a plurality of side connections adjacent to the other edge of the recuperator and in communication with the air passages for the delivery of air therefrom, the side walls of the recuperator being air tight, whereby air delivered from the channel is caused to travel through the passages to the aforementioned delivery openings.

10. A self-contained recuperating wall for use in a bench of coke ovens, said recuperating wall being provided on its interior with a mesh of interconnected air passages extending in zig-zag fashion from its lower to its upper portion, there being a channel extending along the recuperator wall adjacent to the lower portion thereof and in communication with the entire lower portion of the mesh of passages for the delivery of air thereto, and there being a plurality of delivery openings in the upper portion of the wall in communication with the upper portion of the mesh of passages for the delivery of heated air therefrom, the side faces of the recuperator wall being air tight, whereby air delivered from the channel to the mesh of passages is delivered from the mesh of passages through the delivery openings.

11. The combination with a bench of coke ovens or the like, of recuperators located between adjacent walls of adjacent ovens, said recuperators being constructed as independent self-contained elements capable of expansion or adjustment independently of the ovens.

12. The combination with a bench of coke ovens, of recuperators between the adjacent walls of adjacent ovens, said recuperators being constructed as independent elements having air passages on their interior portions and having their side walls air-tight, and capable of being removed without disturbance of the ovens and the heating means thereof.

13. The combination with a pair of coke oven walls, of a recuperator between said walls, said recuperator being constructed as an independent element capable of adjustment and removable independently of the walls.

14. The combination with a bench of coke ovens having heating walls, of recuperators between pairs of heating walls, there being air passages in said recuperators, connections for the delivery of air from said passages to the heating walls, and means for heating the air prior to its delivery to said passages, whereby air entering said passages is preheated, and whereby said preheated air has its temperature maintained during its travel through the said passages.

15. The combination with a bench of coke ovens having walls, of recuperators adjacent to said walls, said recuperators having air passages, connections from said air passages to the walls, and means for preheating air delivered to said passages, whereby said preheated air has its temperature maintained during its travel through the air passages of the recuperators.

ARTHUR ROBERTS.

Witnesses:
 FRANCES M. FROST,
 THOMAS A. BANNING, Jr.